United States Patent
Hee et al.

(12) 
(10) Patent No.: US 6,223,325 B1
(45) Date of Patent: Apr. 24, 2001

(54) PEAK ERROR DETECTOR

(75) Inventors: Wong Hee, San Jose; Abhijit Phanse, Santa Clara, both of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/076,186

(22) Filed: May 12, 1998

Related U.S. Application Data (60) Provisional application No. 60/069,027, filed on Dec. 10, 1997, provisional application No. 60/069,044, filed on Dec. 10, 1997, provisional application No. 60/069,031, filed on Dec. 10, 1997, provisional application No. 60/069,091, filed on Dec. 10, 1997, provisional application No. 60/069,030, filed on Dec. 10, 1997, provisional application No. 60/069,028, filed on Dec. 10, 1997, provisional application No. 60/069,029, filed on Dec. 10, 1997, and provisional application No. 60/067,764, filed on Dec. 10, 1997.

(51) Int. Cl.[7] .................................................. G06F 11/00
(52) U.S. Cl. ........................................... 714/799; 714/812
(58) Field of Search .................................. 714/799, 812; 375/286

(56) References Cited

U.S. PATENT DOCUMENTS

| | | | |
|---|---|---|---|
| 5,710,660 | * | 1/1998 | Yamamoto et al. .................. 359/341 |
| 5,850,514 | * | 12/1998 | Gonda et al. ............................ 714/55 |
| 6,044,489 | * | 3/2000 | Hee et al. ............................. 714/815 |

\* cited by examiner

*Primary Examiner*—Phung M. Chung
(74) *Attorney, Agent, or Firm*—Baker & McKenzie (57) ABSTRACT

A data signal peak error detector for monitoring and detecting undesired shifts in the peak levels of a multilevel data signal, such as an MLT3 Ethernet signal. A signal slicing circuit generates two signals: a data peak detection signal identifies occurrences of data signal peaks and is asserted when the input data signal level has transitioned beyond a value which is intermediate to preceding intermediate and peak (e.g., positive or negative) signal levels; and a data peak error signal identifies occurrences of data signal peak errors and is asserted when the input data signal level has transitioned beyond a value which corresponds to a preceding peak signal level. Assertion of the data peak detection signal initiates a count sequence by a counter. The count sequence is decoded to produce one or more signal pulses, each of which is provided at a respective time after assertion of the first data peak signal and identifies a valid state of the data peak error signal.

28 Claims, 4 Drawing Sheets

PEAK ERROR DETECTOR

RELATED APPLICATIONS

This application claims the benefit of and incorporates herein by reference the following U.S. provisional patent applications:

60/069,027, filed Dec. 10, 1997, entitled "Peak Error Detector"

60/069,044, filed Dec. 10, 1997, entitled "Signal Gating Controller For Enhancing Convergency of MLT3 Data Receivers"

60/069,031, filed Dec. 10, 1997, entitled "Digital Interface Circuit"

60/069,091, filed Dec. 10, 1997, entitled "Digital Signal Processing Control Circuit For Controlling Corrections of Input Data Signal Errors"

60/069,030, filed Dec. 10, 1997, entitled "Control Loop For Data Signal Baseline Correction"

60/069,028, filed Dec. 10, 1997, entitled "Control Loop For Adaptive Equalization of a Data Signal"

60/069,029, filed Dec. 10, 1997, entitled "Control Loop For Multilevel Sampling of a Data Signal"

60/067,764, filed Dec. 10, 1997, entitled "Data Signal Baseline Error Detector"

A portion of the disclosure of this patent document contains material which is subject to copyright protection. The copyright owner has no objection to the facsimile reproduction by anyone of the patent document or the patent disclosure, as it appears in the patent and trademark office, patent file or records, but otherwise reserves all copyright rights whatsoever.

This application is submitted with a microfiche appendix containing copyrighted material, copyright 1996, National Semiconductor Corporation. Such appendix consists of 3 microfiche transparencies with a total of 293 frames.

BACKGROUND OF THE INVENTION

1. Field of the Invention

The present invention relates to circuits for detecting errors in peak signal amplitudes of digital data signals, and in particular, to peak error detection circuits for detecting and identifying valid detected peak signal errors during selected time windows within digital data signals.

2. Description of the Related Art

Recovering data from data signals which have been transmitted over long lengths of cable at high data rates requires that such data signals be equalized in order to compensate for the signal loss and phase dispersion characteristics of the cable. Further, in those applications where the cable length may vary, such equalization must be capable of adapting according to the length of the cable. Conventional adaptive equalization is typically accomplished through the use of a feedback control signal having an amplitude which is proportional to the pulse height of the equalized data signal. However, such a technique for controlling the adaptive equalization process is very sensitive to amplitude errors in the incoming data signal. Accordingly, it would be desirable to have a peak error detector which, by detecting and identifying valid detected errors in the signal peaks of the incoming data signal, can be used to help generate more consistent and more accurate control over the adaptive equalization process.

SUMMARY OF THE INVENTION

A peak error detector in accordance with the present invention provides for the generation of multiple peak error signals indicating the occurrence of errors in the signal peaks within selected frequency bands of the incoming data signal. Such peak error signals identify errors between the peak of the present incoming data signal and estimated peak values of prior data signals within different time windows. Such a peak error detector can be used advantageously in a signal peak tracker or a baseline wander compensation circuit, as well as a control circuit for an adaptive equalizer (e.g., for use in a fast Ethernet transceiver).

A data signal peak error detector in accordance with one embodiment of the present invention includes first and second data signal detection circuits. The first data signal detection circuit is configured to receive and detect an input data signal which includes a plurality of signal levels representing an N-level data signal and in accordance therewith provide a data level signal which is asserted when the input data signal level extends beyond a predetermined value. The input data signal includes, associated therewith, a plurality of sequential intermediate signal values and a plurality of sequential extended signal values each of which extends beyond a preceding one of the plurality of sequential intermediate signal values. The predetermined value corresponds to a value which is between a preceding one of the plurality of sequential intermediate signal values and a preceding one of the plurality of sequential extended signal values. The second data signal detection circuit is configured to receive the first data level signal and in accordance therewith provide one or more signal pulses during the assertion of the first data level signal. Each one of the one or more signal pulses is provided at a respective time after the assertion of the first data level signal.

These and other features and advantages of the present invention will be understood upon consideration of the following detailed description of the invention and the accompanying drawings.

DETAILED DESCRIPTION OF THE INVENTION

Figure 1:
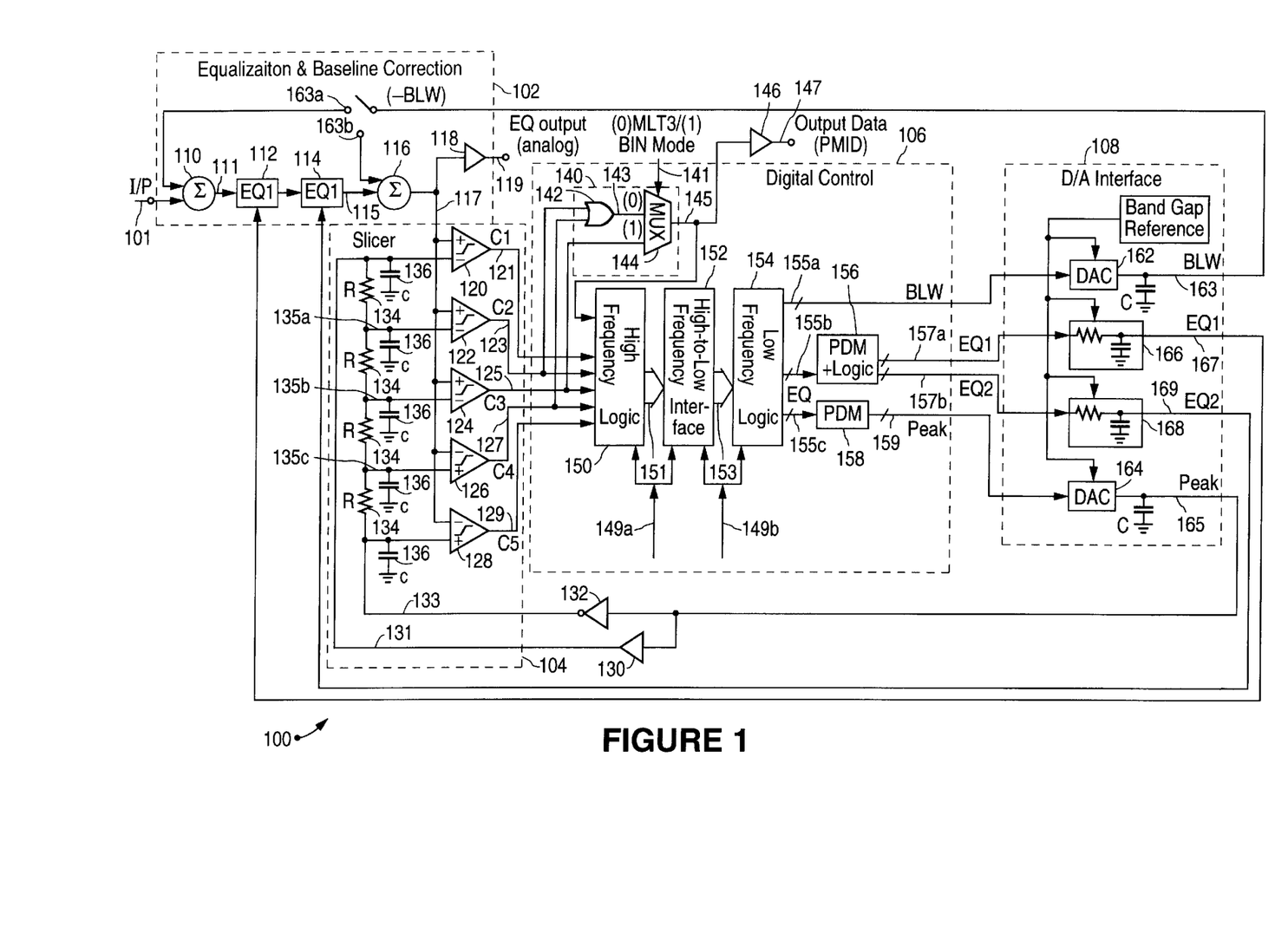
FIG. 1 is a functional block diagram of a high speed data receiver in which a peak error detector in accordance with the present invention can be advantageously used.

Referring to FIG. 1, a circuit in accordance with the present invention is advantageous for use in a high speed data receiver 100 which receives binary or MLT3 encoded data which has been transmitted via a cable (e.g., fast Ethernet). As discussed in more detail below, such a data receiver 100 provides adaptive equalization and dynamic slicing and baseline restoration of the data signal. (Each of the circuit functions or stages as represented in FIG. 1 and discussed below are described in detail in the code listings provided in the microfiche appendix hereto, the contents of which are incorporated herein by reference. A description of a similar data receiver can be found in co-pending, commonly assigned U.S. patent application Ser. No. 08/791,381, filed Jan. 30, 1997, and entitled "High Speed Data Receiver," the disclosure of which is incorporated herein by reference.)

This data receiver 100 includes a correction stage 102, a slicer stage 104, a digital control stage 106 and a digita-toanalog (D/A) interface 108. As discussed in more detail below, the correction stage 102 provides for equalization and baseline wander correction of the input data signal 101. The slicer stage 104 slices the resulting equalized, corrected data signal 117. The digital control stage 106 processes some of the sliced data signals to produce an output digital data signal 147, as well as generate a number of digital control signals 155a, 157a, 157b, 159 for controlling the equalization, baseline wander correction and slicing of the input data signal 101. The D/A interface 108 converts such digital control signals 155a, 157a, 157b, 159 into corresponding analog signals 163, 167, 169, 165 for actually providing such control of the equalization, baseline wander correction and slicing of the input data signal 101.

The incoming data signal 101, which has been received via a long cable of variable length (not shown), is selectively combined with a baseline correction signal 163 (discussed further below) in a signal summer 110. The corrected signal 111 is selectively amplified by a series of adaptive equalizers, 112, 114, which each have a signal gain which increases with frequency in accordance with their respective equalizer control signals 167, 169. The resulting equalized signal 115 is selectively combined with an alternative baseline correction signal 163 in another signal summer 116. (For testing purposes, the final equalized, corrected data signal 117 is buffered by an analog buffer amplifier 118 to be provided as an analog, equalized, corrected output data signal 119, and is also provided to the signal slicer 104.)

A description of a signal equalization technique using a series of signal equalizers in this manner can be found in co-pending, commonly assigned U.S. patent application Ser. No. 08/791,382, filed Jan. 30, 1997, and entitled "Multiple Stage Adaptive Equalizer," the disclosure of which is incorporated herein by reference.

The slicer 104 receives and slices the equalized, corrected data signal 117 in accordance with positive 131 and negative 133 data peak reference signals using a set of voltage comparators 120, 122, 124, 126, 128. The positive 131 and the negative 133 data peak reference signals are the buffered, non-inverted and inverted versions of a data peak signal 165 (discussed further below) as generated by non-inverting 130 and inverting 132 buffer amplifiers, respectively. These data peak reference signals 131, 133 are applied differentially across a resistive voltage divider with four resisters 134, thereby generating five respective reference signals 131, 135a, 135b, 135c, 133, each of which is filtered by a capacitor 136 for use as a reference signal for its respective voltage comparator 120, 122, 124, 126, 128. Based upon these reference signals, 131, 135a, 135b, 135c, 133, each comparator 120, 122, 124, 126, 128 produces a respective binary output signal 121, 123, 125, 127, 129, each of which is asserted at a logic one level when the data signal 117 transcends the value of the corresponding reference input signal 131, 135a, 135b, 135c, 133.

For example, for the positive 120 and negative 128 peak voltage comparators, the positive 131 and negative 133 data peak reference signals serve as their reference signals, respectively. The middle reference signal 135b represents the mean (e.g., zero or baseline) and serves as the reference signal for the middle comparator 124. The remaining positive reference signal 135a represents a voltage between the mean voltage 135b and the positive peak voltage 131 and serves as the reference for the positive level comparator 122. Similarly, the remaining negative reference 135c represents a voltage between the mean voltage 135b and the negative peak voltage 133 and serves as the reference for the negative level comparator 126.

The binary data signals 121, 123, 125, 127, 129 are received and processed by the digital control stage 106 as follows. The mean 125, positive 123 and negative 127 data signals are processed by a decoder 140 to produce a data signal 145 which is buffered by a buffer amplifier 146 to produce the output digital data signal 147. The positive 123 and negative 127 data signals are logically summed in an OR Gate 142. Then, either the resulting logical sum signal 143 or mean data signal 125 is selected with a multiplexor 144 in accordance with a control signal 141, depending upon whether the original input data signal 101 is an MLT3 or binary signal. This data signal 145 and the binary data signals 121, 123, 125, 127, 129 are received and processed by a high frequency logic stage 150 in accordance with a high frequency clock signal 149a.

The high frequency logic stage 150 processes its input signals 145, 121, 123, 125, 127, 129 in a number of ways to produce a set 151 of digital signals which are then converted to a corresponding set 153 of digital signals at a lower frequency by the high-to-low frequency stage 152 in accordance with the high frequency clock signal 149a and a low frequency clock signal 149b. (By way of example, for fast Ethernet, the high frequency clock signal 149a has a frequency in the hundreds of megahertz and the low frequency clock signal 149b has a frequency in the tens of megahertz.) As discussed in more detail below, one operation performed by the high frequency logic stage 150 is that of peak error detection, whereby multiple peak error signals representing variations in the signal peaks within selected frequency bands of the incoming data signal are generated and validated so as to identify the occurrence of errors between the peak of the present incoming data signal and estimated peak values of prior incoming data signals within different time windows.

Another operation performed is that of baseline error detection, whereby a baseline error signal which is generated during an intermediate level state of the multiple level data signal 117 (such as the zero-state of an MLT3 signal) is validated, thereby identifying the occurrence of an error between the baseline of the incoming data signal and an estimated baseline level. A description of this baseline error detection circuit can be found in co-pending, commonly assigned U.S. patent application Ser. No. 09/076,261, filed May 12, 1998, and entitled "Data Signal Baseline Error Detector" (attorney docket no. NSC1-C1010), the disclosure of which is incorporated herein by reference. Yet another operation performed is that of generating gating control signals for gating out false signal pulses caused by improper equalization of the original incoming data signal 101. A description of this gating control circuit can be found in co-pending, commonly assigned U.S. patent application Ser. No. 09/076,425, filed May 12, 1998, and entitled "Signal Gating Controller for Enhancing Convergency of MLT3 Data Receivers" (attorney docket no. NSC1-C0310), the disclosure of which is incorporated herein by reference.

The low frequency logic stage 154, in accordance with the low frequency clock signal 149b, processes these lower frequency signals 153 to produce a number of digital control signals 155a, 155b, 155c. More specifically, the low frequency logic stage 154 processes the lower frequency error signals 153 to produce control signals for compensating for variations in peak signal values and correcting errors in the baseline of the incoming data signal 101/115, as well as controlling the equalization of the incoming data signal 101. A more detailed description of the low frequency logic stage 154 can be found in co-pending, commonly assigned U.S. patent application Ser. No. 09/076,187, filed May 12, 1998, and entitled "Distributive Encoder For Encoding Error Signals Which Represent Signal Peak Errors In Data Signals For Identifying Erroneous Signal Baseline, Peak And Equalization Conditions" (attorney docket no. NSC1-C0610), the disclosure of which is incorporated herein by reference.

The high-to-low frequency interface 152, in accordance with the high 149a and low 149b frequency clock signals, converts the incoming error signals 151 to a corresponding set 153 of lower frequency error signals. A more detailed description of this interface 152 can be found in co-pending, commonly assigned U.S. patent application Ser. No. 09/076, 263, filed May 12, 1998, and entitled "Digital Interface Circuit" (attorney docket no. NSCI-C0510), the disclosure of which is incorporated herein by reference.

One set 155a of control signals produced by the low frequency logic stage 154 is used for correcting baseline wander of the original input data signal 101. This set 155a of digital signals is converted to an analog baseline wander control signal 163 by way of a digital-to-analog converter 162. This analog control signal 163 is then summed with either the original input data signal 101 or the equalized input data signal 115, as discussed above.

Another set 155b of control signals is used to generate the equalization control signals 167, 169 for the adaptive equalizers 112, 114 (discussed above). This set 155b of signals is processed using a circuit 156 which includes a pulse density modulator and some associated logic circuitry to produce, in turn, two pulse density modulated control signals 157a, 157b for controlling the two adaptive input signal equalizers 112, 114. Each of these signals 157a, 157b is converted to its respective analog control signal 167, 169 with a resistive-capacitive digital-to-analog conversion circuit 166, 168. A more detailed description of this signal converter can be found in co-pending, commonly assigned U.S. patent application Ser. No. 08/791,367 filed Jan. 30, 1997, and entitled "Distributive Digital-to-Analog Converter," the disclosure of which is incorporated herein by reference.

Yet another set of control signals 155c is used to generate an analog peak signal 165 which is used to generate the differential peak reference signals 131, 133 for the slicer 104, as discussed above. These digital signals 155c are converted with a pulse density modulator 158 to produce a set 159 of pulse density modulated signals which, in turn, are then converted to the analog peak signal 165 by a digital-to-analog converter 164.

Figure 2:
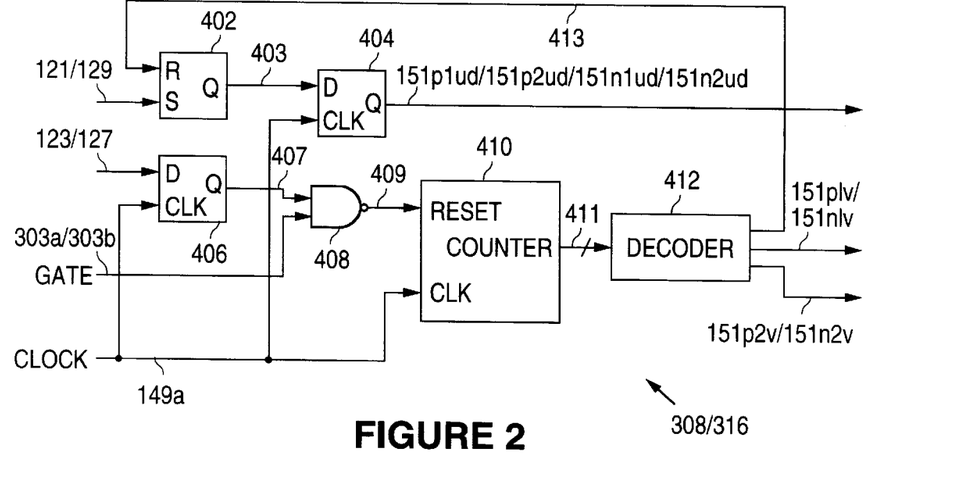
FIG. 2 is a schematic diagram of a peak error detector in accordance with one embodiment of the present invention.

Referring to FIG. 2, a peak error detector 308/316 in accordance with one embodiment of the present invention includes digital logic which forms the following functional logic blocks: an RS (reset/set) flip-flop 402, two D-type flip-flops 404, 406, a NAND gate 408, a counter 410 and a decoder 412, all interconnected substantially as shown. (Throughout this discussion, for those signals which are identified by two numeric designators the first numeric designator corresponds to the signal for a positive ("P") peak error detector 308, while the second numeric designator corresponds to the signal for a negative ("N") peak error detector 316.)

The RS flip-flop 402 is set and reset in accordance with the P/N peak signal 121/129 and a feedback reset control signal 413 from the decoder 412, respectively. Its output signal 403 is latched in a flip-flop 404 in accordance with a clock signal 149a. Accordingly, this output signal 151p1ud/151p2ud/151n1ud/151n2ud is asserted at a logic 1 when the P/N peak signal 121/129 indicates that the amplitude of the input data signal 117 exceeds the P/N data peak reference signal 131/133 (FIG. 1).

The P/N data signal 123/127 is latched by a flip-flop 406, the output 407 of which is gated in a NAND gate 408 by the gating control signal 303a/303b. This gated signal 409, when asserted, resets the counter 410 to zero. Accordingly, when the P/N data signal 123/127 becomes a logic 1, i.e., at the beginning of a pulse within the input data signal 117, the reset control signal 409 is de-asserted and the counter begins counting from zero in a counting sequence of 01376453764537645 . . . The count sequence signal 411 is decoded by the decoder 412 to generate two peak error validation signals 151p1v/151n1v, 151p2v/151n2v and the reset signal 413 for the RS flip-flop 402. Based upon these signals 151p1v/151n1v, 151p2v/151n2v, 413, the decoder 412 defines multiple time windows DT1, DT2(1), DT2(2), . . . , DT2(N) within the pulse width of the input data signal 117. The pulse width of this data signal 117 affects the number of time windows which are created. At the end of each time window, a one clock cycle reset pulse 413 is generated for resetting the RS flip-flop 402.

Figure 3A:
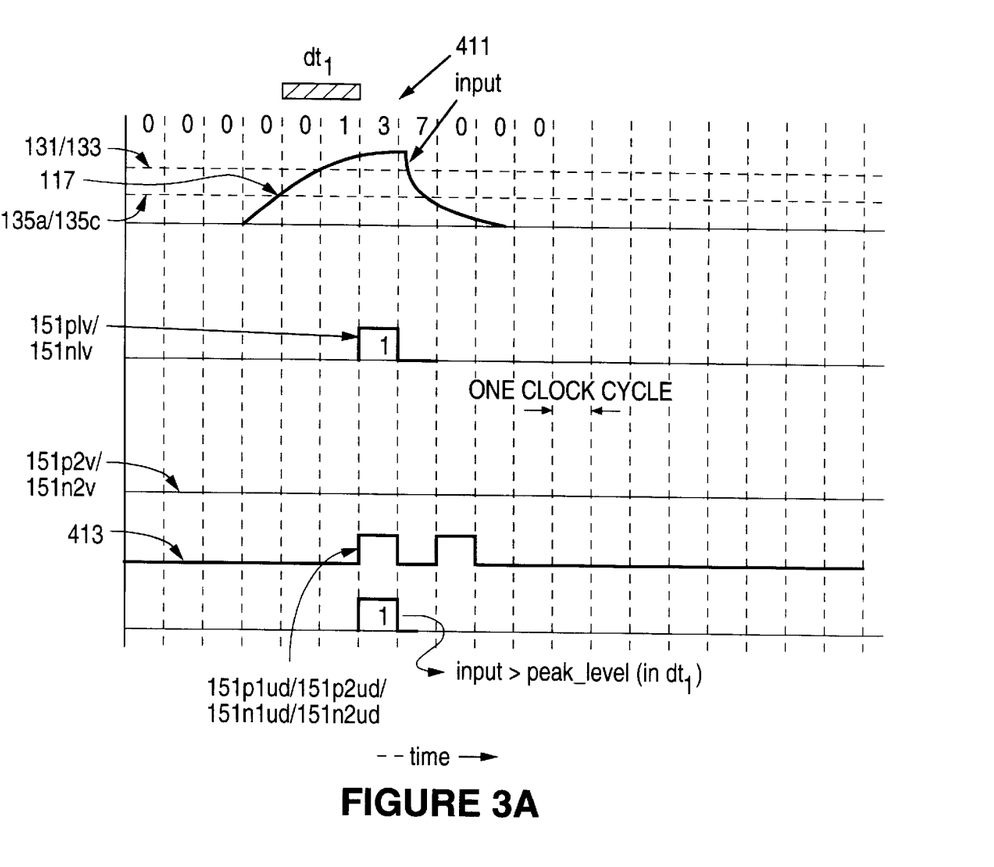
FIGS. 3A, 3B and 3C are signal timing diagrams illustrating the operation of the peak error detector of FIG. 2 for input data signal pulses of varying durations.
Figure 3B:
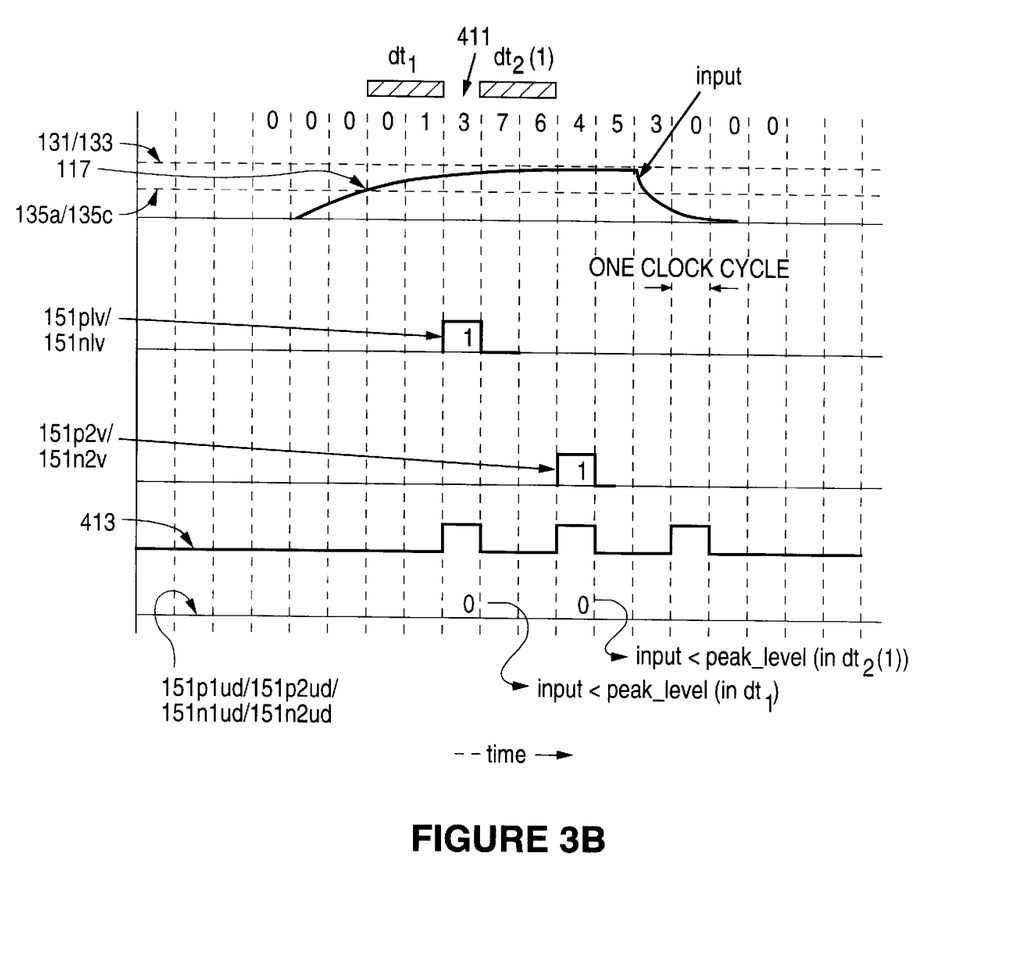
Figure 3C:
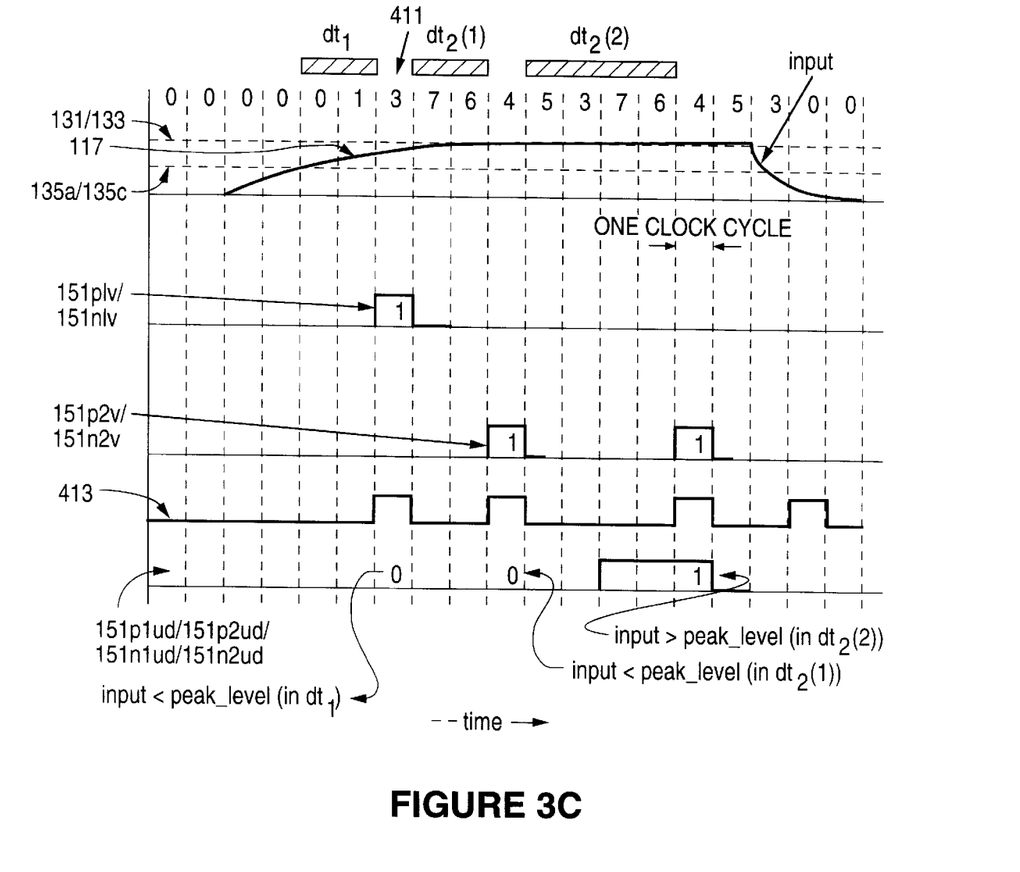

Referring to FIGS. 3A, 3B and 3C, the generation of the peak error validation signals 151p1v/151n1v, 151p2v/151n2v and peak error signal 151p1ud/151p2ud/151n1ud/151n2ud can be better understood. For example, within the first time window DT1, if the input data signal 117 is greater than the P/N data peak reference signal 131/133, then the peak error signal 151p1ud/151p2ud/151n1ud/151n2ud is asserted at a logic 1. However, if the input data signal 117 remains less than the P/N data peak reference signal 131/133 throughout such time interval DT1, then the peak error signal 151p1ud/151p2ud/151n1ud/151n2ud remains de-asserted at a logic zero. When this signal 151p1ud/151p2ud/151n1ud/151n2ud is asserted, it represents the error between the peak of the input data signal 117 and the P/N data peak reference signal 131/133 during the corresponding time interval. At the end of such time interval DT1, the corresponding peak error validation signal 151p1v/151n1v/151p2v/151n2v is asserted to indicate that the state of the peak error signal 151p1ud/151p2ud/151n1ud/151n2ud is valid for purposes of identifying any signal errors occurring during such time interval DT1. Also at the end of such time interval DT1, coincident with the peak error validation signals 151p1v/151n1v, 151p2v/151n2v, and after the input data signal 117 has transitioned back through the level of the positive/negative reference signal 135a/135c, the reset signal 413 resets the RS flip-flop 402.

Additional time windows DT2(1), DT2(2), . . . are created as necessary, depending upon the duration of the input data signal 117 pulse. The first error validation signal 151p1v/151n1v is used for validating the peak error information (i.e., the peak error signal 151p1ud/151p2ud/151n1ud/151n2ud) corresponding to errors identified as having occurred during time interval DT1. Similarly, the second error validation signal 151p2v/151n2v is used for validating the peak error information corresponding to errors identified as having occurred during subsequent DT2(n) time intervals. The position of the time window within the pulse width determines the relative frequency band within which the peak error is to be evaluated. For example, the peak error information evaluated in a time window close to the rising edge of the pulse, i.e., time interval DT1, represents the peak error at higher frequencies, while peak error information evaluated in a time window closer to the end of the pulse, i.e., time interval DT2(N), represents the peak error at lower frequencies.

Based upon the foregoing, a number of advantages of a peak error detector in accordance with the present invention can be seen. The peak error information generated at multiple frequency bands can be advantageously used for tracking peaks of the input signal, compensating for signal baseline wander and controlling adaptive equalization. An asynchronous RS flip-flop is used to detect signal peaks, thereby significantly reducing the required sampling frequency, i.e., the operating frequency of the circuit. No analog-to-digital converters are required, thereby providing a low cost, reliable and more easily manufactured design for high frequency applications.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a data signal peak error detector, comprising:

a first data signal detection circuit that following reception thereof detects an input data signal which includes a plurality of signal levels representing an N-level data signal and provides a first data level signal which is asserted when said input data signal level extends beyond a first predetermined value, wherein said input data signal includes, associated therewith,
a plurality of sequential intermediate signal values, and
a first plurality of sequential extended signal values each of which extends with a first polarity beyond a preceding one of said plurality of sequential intermediate signal values, and said first predetermined value corresponds to a first value which is between a preceding one of said plurality of sequential intermediate signal values and a preceding one of said first plurality of sequential extended signal values; and a second data signal detection circuit, coupled to said first data signal detection circuit, that following reception of said first data level signal provides one or more signal pulses during said assertion of said first data level signal, wherein each one of said one or more signal pulses is provided at a respective time after said assertion of said first data level signal.

2. The apparatus of claim 1, wherein said input data signal further includes, associated therewith, a second plurality of sequential extended signal values each of which extends with a second polarity opposite to said first polarity beyond a preceding one of said plurality of sequential intermediate signal values, and further wherein said first predetermined value corresponds to a first value which is between a preceding one of said plurality of sequential intermediate signal values and a preceding one of said first and second pluralities of sequential extended signal values.

3. The apparatus of claim 2, wherein said first data signal detection circuit, following said detection of said input data signal, further provides a second data level signal which is asserted when said input data signal level extends beyond a second predetermined value which corresponds to a preceding one of said first and second pluralities of sequential extended signal values.

4. The apparatus of claim 1, wherein said first data signal detection circuit, following said detection of said input data signal, further provides a second data level signal which is asserted when said input data signal level extends beyond a second predetermined value which corresponds to a preceding one of said first plurality of sequential extended signal values.

5. The apparatus of claim 4, wherein:

said second data level signal includes said asserted state which indicates when said input data signal level extends beyond said second predetermined value and further includes a de-asserted state which indicates when said input data signal level does not extend beyond said second predetermined value; and each one of said one or more signal pulses indicates a valid state of said asserted state of said second data level signal.

6. The apparatus of claim 5, wherein said one or more signal pulses include one or more peak error pulses which represent one or more signal peak errors in said input data signal.

7. The apparatus of claim 6, wherein said one or more peak error pulses represent one or more signal peak errors in said input data signal during a corresponding one or more respective time periods.

8. The apparatus of claim 7, wherein said second data signal detection circuit comprises:

a counter that following reception of said first data level signal provides a count sequence signal during said assertion of said first data level signal; and a decoder, coupled to said counter, that following reception thereof decodes said count sequence signal and provides a pulsed signal.

9. The apparatus of claim 1, wherein said first data signal detection circuit comprises:

a reference signal source that provides a reference signal having a reference signal value which corresponds to said first predetermined value; and a signal comparison circuit, coupled to said reference signal source, that compares said input data signal with said reference signal.

10. The apparatus of claim 9, wherein:

said reference signal source comprises a voltage divider circuit that following reception thereof divides a first voltage having a value which corresponds to a preceding one of said first plurality of sequential extended signal values and provides a reference voltage as said reference signal; and said signal comparison circuit comprises a voltage comparator, coupled to said voltage divider circuit, that compares said input data signal with said reference voltage.

11. The apparatus of claim 1, wherein said second data signal detection circuit comprises:

a counter that following reception of said first data level signal provides a count sequence signal during said assertion of said first data level signal; and a decoder, coupled to said counter, that following reception thereof decodes said count sequence signal and provides a pulsed signal.

12. An apparatus including a data signal peak error detector, comprising:

a first data signal detection circuit that following reception thereof detects an input data signal which includes a plurality of signal levels representing an N-level data signal and provides a first data level signal which is asserted when said input data signal level extends beyond a first predetermined value and a second data level signal which is asserted when said input data signal level extends beyond a second predetermined value which corresponds to a preceding one of said first plurality of sequential extended signal values, wherein said input data signal includes, associated therewith,
a plurality of sequential intermediate signal values, and
a first plurality of sequential extended signal values each of which extends with a first polarity beyond a preceding one of said plurality of sequential intermediate signal values, and
said first predetermined value corresponds to a first value which is between a preceding one of said plurality of sequential intermediate signal values and a preceding one of said first plurality of sequential extended signal values;

a second data signal detection circuit coupled to said first data signal detection circuit, that following reception of said first data level signal provides one or more signal pulses during said assertion of said first data level signal, wherein each one of said one or more signal pulses is provided at a respective time after said assertion of said first data level signal; and an asynchronous latching circuit, coupled to said first data signal detection circuit, that in response to reception thereof asynchronously latches said second data level signal.

13. An apparatus including a data signal peak error detector, comprising:

a first data signal detection circuit that following reception thereof detects an input data signal which includes a plurality of signal levels representing an N-level data signal and provides a first data level signal which is asserted when said input data signal level extends beyond a first predetermined value, wherein said input data signal includes, associated therewith,
a plurality of sequential intermediate signal values, and
a first plurality of sequential extended signal values each of which extends with a first polarity beyond a preceding one of said plurality of sequential intermediate signal values, and
said first predetermined value corresponds to a first value which is between a preceding one of said plurality of sequential intermediate signal values and a preceding one of said first plurality of sequential extended signal values; and a second data signal detection circuit coupled to said first data signal detection circuit, that following reception of said first data level signal provides one or more signal pulses during said assertion of said first data level signal, wherein each one of said one or more signal pulses is provided at a respective time after said assertion of said first data level signal;

wherein:

said input data signal further includes, associated therewith, a second plurality of sequential extended signal values each of which extends with a second polarity opposite to said first polarity beyond a preceding one of said plurality of sequential intermediate signal values;

said apparatus further comprises a third data signal detection circuit that following reception thereof detects said input data signal and provides a second data level signal which is asserted when said input data signal level extends beyond a second predetermined value; and said second predetermined value corresponds to a second value which is between a preceding one of said plurality of sequential intermediate signal values and a preceding one of said second plurality of sequential extended signal values.

14. The apparatus of claim 13, wherein:

said second data signal detection circuit comprises a first counter that following reception of said first data level signal provides a first count sequence signal during said assertion of said first data level signal, and a first decoder, coupled to said first counter, that following reception thereof decodes said first count sequence signal and provides a first pulsed signal; and said third data signal detection circuit comprises a second counter that following reception of said second data level signal provides a second count sequence signal during said assertion of said second data level signal, and a second decoder, coupled to said second counter, that following reception thereof decodes said second count sequence signal and provides a second pulsed signal.

15. A method of data signal peak error detection, comprising the steps of:

receiving and detecting an input data signal which includes a plurality of signal levels representing an N-level data signal and in accordance therewith generating a first data level signal which is asserted when said input data signal level extends beyond a first predetermined value, wherein said input data signal includes, associated therewith,
a plurality of sequential intermediate signal values, and
a first plurality of sequential extended signal values each of which extends with a first polarity beyond a preceding one of said plurality of sequential intermediate signal values, and
said first predetermined value corresponds to a first value which is between a preceding one of said plurality of sequential intermediate signal values and a preceding one of said first plurality of sequential extended signal values; and receiving said first data level signal and in accordance therewith generating one or more signal pulses during said assertion of said first data level signal, wherein each one of said one or more signal pulses is provided at a respective time after said assertion of said first data level signal.

16. The method of claim 15, wherein said step of receiving and detecting an input data signal comprises receiving and detecting an input data signal which further includes, associated therewith, a second plurality of sequential extended signal values each of which extends with a second polarity opposite to said first polarity beyond a preceding one of said plurality of sequential intermediate signal values, and further wherein said first predetermined value corresponds to a first value which is between a preceding one of said plurality of sequential intermediate signal values and a preceding one of said first and second pluralities of sequential extended signal values.

17. The method of claim 16, wherein said step of receiving and detecting an input data signal further comprises receiving and detecting said input data signal and in accordance therewith generating a second data level signal which is asserted when said input data signal level extends beyond a second predetermined value which corresponds to a preceding one of said first and second pluralities of sequential extended signal values.

18. The method of claim 15, further comprising the step of receiving and detecting said input data signal and in accordance therewith generating a second data level signal which is asserted when said input data signal level extends beyond a second predetermined value which corresponds to a preceding one of said first plurality of sequential extended signal values.

19. The method of claim 18, wherein:
said second data level signal includes said asserted state which indicates when said input data signal level extends beyond said second predetermined value and further includes a de-asserted state which indicates when said input data signal level does not extend beyond said second predetermined value; and
each one of said one or more signal pulses indicates a valid state of said asserted state of said second data level signal.

20. The method of claim 19, wherein said one or more signal pulses includes one or more peak error pulses which represent one or more signal peak errors in said input data signal.

21. The method of claim 20, wherein said one or more peak error pulses represent one or more signal peak errors in said input data signal during a corresponding one or more respective time periods.

22. The method of claim 21, wherein said step of receiving said first data level signal and in accordance therewith generating one or more signal pulses during said assertion of said first data level signal comprises:
receiving said first data level signal and in accordance therewith generating a count sequence signal during said assertion of said first data level signal; and
decoding said count sequence signal and in accordance therewith generating a pulsed signal.

23. The method of claim 15, wherein said step of receiving and detecting an input data signal which includes a plurality of signal levels representing an N-level data signal and in accordance therewith generating a first data level signal which is asserted when said input data signal level extends beyond a first predetermined value comprises:
generating a reference signal having a reference signal value which corresponds to said first predetermined value; and
comparing said input data signal with said reference signal.

24. The method of claim 23, wherein:
said step of generating a reference signal having a reference signal value which corresponds to said first predetermined value comprises receiving and dividing a first voltage having a value which corresponds to a preceding one of said first plurality of sequential extended signal values and in accordance therewith generating a reference voltage as said reference signal; and
said step of comparing said input data signal with said reference signal comprises comparing said input data signal with said reference voltage.

25. The method of claim 15, wherein said step of receiving said first data peak signal and in accordance therewith generating one or more signal pulses during said assertion of said first data peak signal comprises:
receiving said first data peak signal and in accordance therewith generating a count sequence signal during said assertion of said first data peak signal; and
decoding said count sequence signal and in accordance therewith generating a pulsed signal.

26. A method of data signal peak error detection, comprising the steps of:
receiving and detecting an input data signal which includes a plurality of signal levels representing an N-level data signal and in accordance therewith generating a first data level signal which is asserted when said input data signal level extends beyond a first predetermined value, wherein
said input data signal includes, associated therewith,
a plurality of sequential intermediate signal values, and
a first plurality of sequential extended signal values each of which extends with a first polarity beyond a preceding one of said plurality of sequential intermediate signal values, and
said first predetermined value corresponds to a first value which is between a preceding one of said plurality of sequential intermediate signal values and a preceding one of said first plurality of sequential extended signal values;
receiving said first data level signal and in accordance therewith generating one or more signal pulses during said assertion of said first data level signal, wherein each one of said one or more signal pulses is provided at a respective time after said assertion of said first data level signal;
receiving and detecting said input data signal and in accordance therewith generating a second data level signal which is asserted when said input data signal level extends beyond a second predetermined value which corresponds to a preceding one of said first plurality of sequential extended signal values; and
receiving and asynchronously latching said second data level signal.

27. A method of data signal peak error detection, comprising the steps of:
receiving and detecting an input data signal which includes a plurality of signal levels representing an N-level data signal and in accordance therewith generating a first data level signal which is asserted when said input data signal level extends beyond a first predetermined value, wherein
said input data signal includes, associated therewith,
a plurality of sequential intermediate signal values, and
a first plurality of sequential extended signal values each of which extends with a first polarity beyond a preceding one of said plurality of sequential intermediate signal values, and
said first predetermined value corresponds to a first value which is between a preceding one of said plurality of sequential intermediate signal values and a preceding one of said first plurality of sequential extended signal values;
receiving said first data level signal and in accordance therewith generating one or more signal pulses during said assertion of said first data level signal, wherein each one of said one or more signal pulses is provided at a respective time after said assertion of said first data level signal;

wherein:

said input data signal further includes, associated therewith, a second plurality of sequential extended signal values each of which extends with a second polarity opposite to said first polarity beyond a preceding one of said plurality of sequential intermediate signal values;

said method further comprises the step of receiving and detecting said input data signal and in accordance therewith generating a second data level signal which is asserted when said input data signal level extends beyond a second predetermined value; and said second predetermined value corresponds to a second value which is between a preceding one of said plurality of sequential intermediate signal values and a preceding one of said second plurality of sequential extended signal values.

28. The method of claim 27, wherein:

said step of receiving said first data level signal and in accordance therewith generating one or more signal pulses during said assertion of said first data level signal comprises:

receiving said first data level signal and in accordance therewith generating a first count sequence signal during said assertion of said first data level signal, and decoding said first count sequence signal and in accordance therewith generating a first pulsed signal; and said step of receiving and detecting said input data signal and in accordance therewith generating a second data level signal which is asserted when said input data signal level extends beyond a second predetermined value comprises receiving said second data level signal and in accordance therewith generating a second count sequence signal during said assertion of said second data level signal, and decoding said second count sequence signal and in accordance therewith generating a second pulsed signal.

* * * * *

UNITED STATES PATENT AND TRADEMARK OFFICE
CERTIFICATE OF CORRECTION

PATENT NO.   : 6,223,325 B1
DATED        : April 24, 2001
INVENTOR(S)  : Hee et al.

It is certified that error appears in the above-identified patent and that said Letters Patent is hereby corrected as shown below:

<u>Column 9,</u>
Line 19, delete "circuit coupled" and replace with -- circuit, coupled --.
Line 51, delete "circuit coupled" and replace with -- circuit, coupled --.

Signed and Sealed this

Twenty-seventh Day of November, 2001

Attest:

NICHOLAS P. GODICI
*Attesting Officer*   *Acting Director of the United States Patent and Trademark Office*